Nov. 5, 1946.      D. W. MAIN      2,410,545
PITCH CONTROL MECHANISM FOR ROTORS OF ROTARY WING AIRCRAFT
Filed March 15, 1943      2 Sheets-Sheet 1

INVENTOR.
DAVID W. MAIN
BY
ATTORNEY

Nov. 5, 1946.    D. W. MAIN    2,410,545
PITCH CONTROL MECHANISM FOR ROTORS OF ROTARY WING AIRCRAFT
Filed March 15, 1943    2 Sheets-Sheet 2

INVENTOR.
DAVID W. MAIN
BY
Martin E Anderson
ATTORNEY

Patented Nov. 5, 1946

2,410,545

UNITED STATES PATENT OFFICE 2,410,545

PITCH CONTROL MECHANISM FOR ROTORS OF ROTARY WING AIRCRAFT

David W. Main, Denver, Colo.

Application March 15, 1943, Serial No. 479,288

2 Claims. (Cl. 244—17)

This invention relates to improvements in airplanes and has reference more particularly to an improved airplane of the type shown and described in my copending application Serial No. 472,269, filed January 13, 1943, now Patent No. 2,389,798.

It is the principal purpose of this invention to further simplify the controls and mechanism described in the above mentioned application, also to improve the maneuverability of the ship while permitting most of the maneuvers to be performed without tilting the ship, thereby resulting in increased speed, efficiency and comfort to the occupants.

It is the object of this invention to produce an airplane of such construction that it can be launched from airfields of very small size.

One of the objects of this invention is to provide a construction whereby the rotor itself is adapted to perform most of the necessary functions.

Another object of the invention is to produce a mechanism that, in addition to its lifting and propelling action, shall be of such construction that it can be used for depressing the airplane at a rate greater than that of gravity and, in addition, which will enable the operator to change the propellers from a position in which they exert a forward tractive effort to one in which they exert a similar effort directed in the opposite direction thereby making it possible to employ the propellers as brakes to facilitate the stopping of the plane.

Having thus briefly described the objects of the invention, the latter will now be described in detail, and for this purpose reference will be had to the accompanying drawings in which the invention has been illustrated, and in which.

Figure 1:
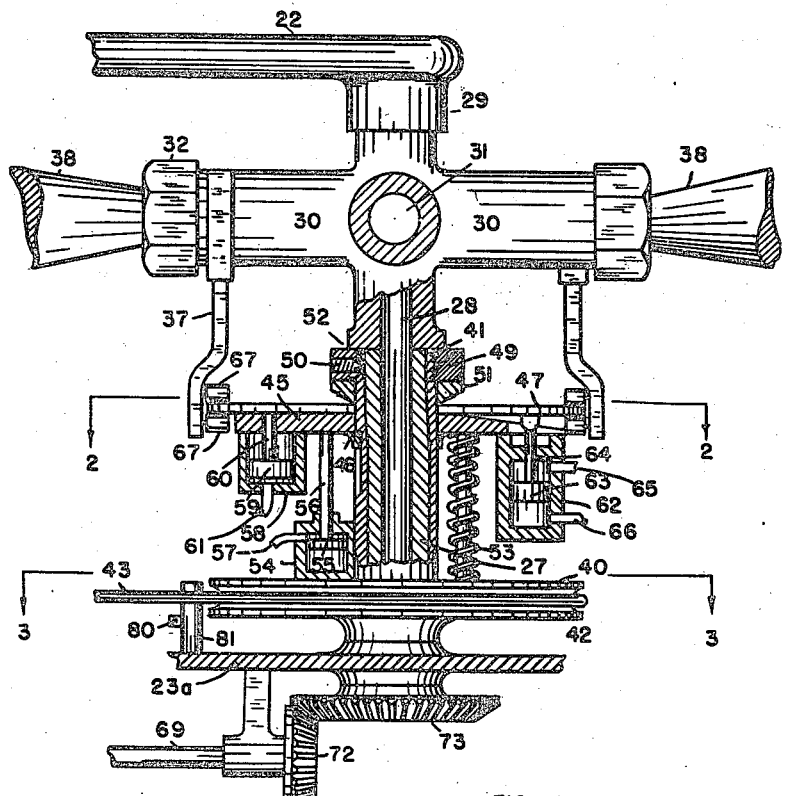
Figure 1 is a view partly in section and partly in elevation showing one form of mechanism for controlling the pitch of the propeller blades.
Figure 6:
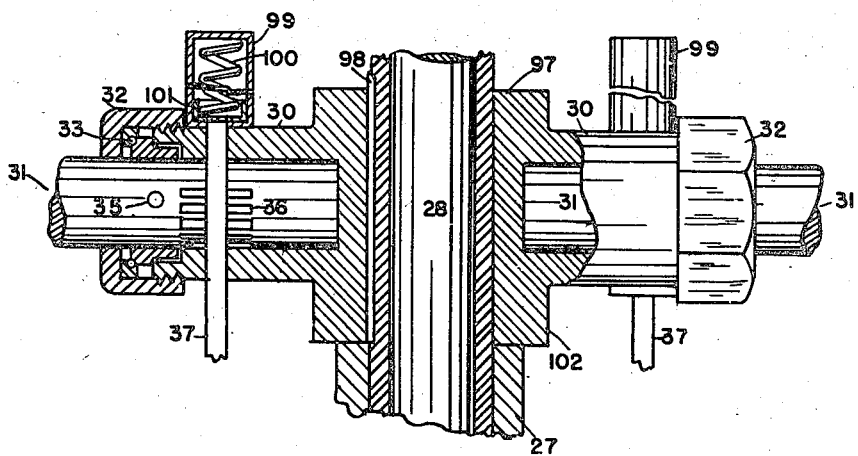
Figure 6 is a diametrical section taken through the propeller shaft and illustrates the construction in greater detail.
Figure 5:
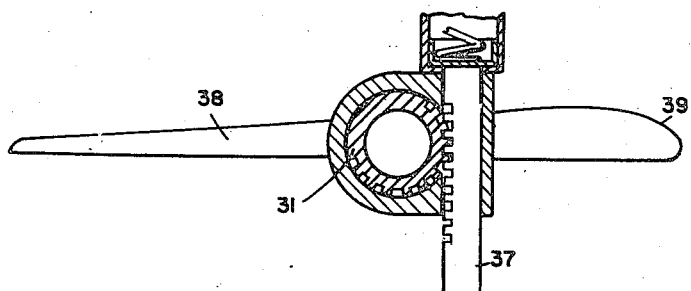
Figure 5 is a section taken on line 10—10, Figure 1, and shows a portion of the pitch controlling mechanism.
Figure 3:
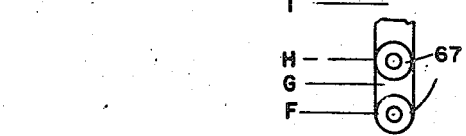
Figure 3 is a view to a somewhat decreased scale, taken on line 6—6, Figure 1.
Figure 3:
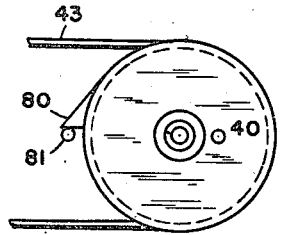

In order to describe the construction and operation, reference will now be had to Figure 1 in which reference numeral 23a designates the upper wall of the beam 23. Extending upwardly from this beam is an elongated bearing 27 in which the propeller shaft 28 is mounted for rotation. The upper end of the propeller shaft is journaled in a bearing 29 that extends downwardly from beam 22. Between the upper end of bearing 27 and the bearing 29, a propeller hub is positioned. This hub comprises four arms 30 that, in the embodiments shown, are positioned at right angles to each other. Mounted for rotation in the arms 30 are the root portions 31 of the propeller blades. The construction of the hub and the method of mounting the propeller blades therein can be seen more clearly from Figure 6, to which reference will now be made. The outer end of each hub arm is threaded for the reception of a nut 32 that serves to hold the outer ball race 33 in position. The inner ball race 34 is secured to the propeller blade root by means of a pin 35 or some other equivalent means. The root portions of the blades are provided with teeth 36 that cooperate with corresponding teeth on the racks 37. The relationship of the racks to the roots 31 of the blades is shown most clearly in Figure 5, to which reference may be had. The propeller blades have been designated by reference numeral 38 and are so positioned with respect to their axes of rotation in the hub that the leading end of the blade, which has been designated by reference numeral 39 in Figure 5, is shorter than the following portion so that under ordinary circumstances, when the blade is in position to exert lifting pitch, there will be a tendency to rotate the blade in a clockwise direction when viewed as in Figure 5.

Figure 2:
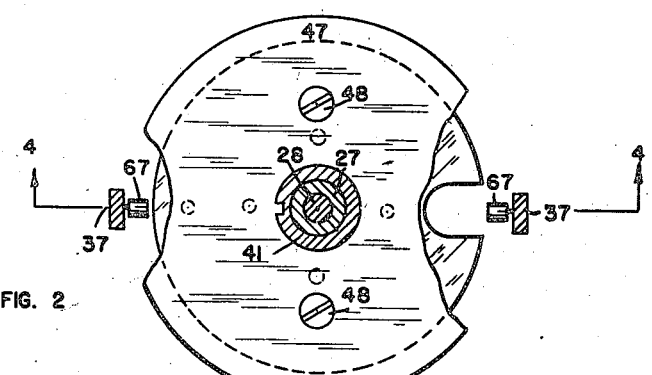
Figure 2 is a view taken on line 5—5, Figure 1, portions of one of the elements being broken away to better disclose the construction.

Mounted for rotary movement on the bearing 27 is a circular pulley 40. Extending upwardly from this pulley and formed integral therewith is a hub 41 whose inner diameter is of such size that it permits free rotary movement about the bearing 27. Pulley 40 is provided with a peripheral groove 42 in which is positioned a steel cable 43. At this point it will be remarked that the steel cable is merely illustrative of means for rotating the pulley and may be replaced by a sprocket chain or by a gear, if desired. The upwardly extending hub 41 is provided with one or more spline grooves 44 whose function will presently appear. A plate 45 has a short downwardly extending hub 46 of the proper size to receive the upwardly extending hub 41 with a sliding fit. The inner surface of hub 46 is provided with splines that engage in and cooperate with the spline grooves 44 so as to prevent relative rotation between the plate 45 and the hub 41 and as a consequence to constrain the pulley 40 and the plate 45 to rotate in unison. Secured to the upper surface of plate 45 is a thin flexible steel plate or disk 47. This plate is of larger diameter than plate 45 as will clearly appear from Figure 2 and is secured to the latter by some suitable means such as screws 48. It will be observed that the screws 48 are positioned on a diameter and since this is the only means of attachment to plate 45, it permits the disk 47 to be flexed about a line joining the centers of the screws 48 in a manner and for a purpose which will hereafter appear.

Figure 4:
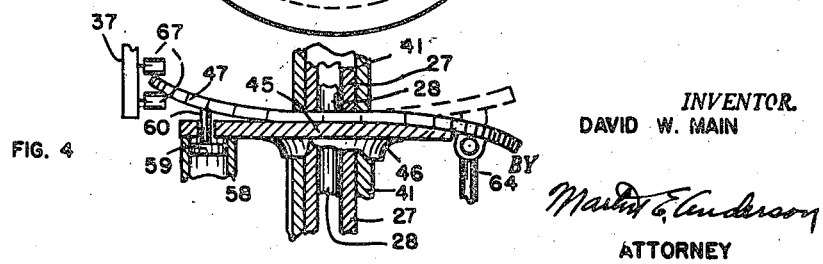
Figure 4 is a section taken on line 7—7, Figure 2, and shows the position of the parts during one of the several adjustments.

Referring now to Figure 1, it will be observed that the hub 41 terminates at the same level as the bearing 27 and is threaded for the reception of a round nut 49 that is held in adjusted position by means of a set screw 50. Positioned between the nut 49 and the plate 47 is a washer-like member 51 whose lower surface is inclined from opposite sides forming a wedge-like structure whose apex 52 rests against the upper surface of plate 47 and forms a fulcrum which co-operates with the screws 48 to hold plate 47 against the upper surface of plate 45. A plurality of compression springs 53 are positioned between the pulley 40 and the under surface of plate 45 and serve to force the latter upwardly against the apex 52 of the washer 51. One or more cylinders 54 are secured to the upper surface of the pulley 40 and are each provided with a piston 55 having a piston rod 46 whose upper end is connected with the plate 45. When air, or other fluid, under sufficient pressure is introduced into the cylinder 54 between the upper end thereof and the piston 55, through the pipe 57, piston 55 will move downwardly and cause the plate 45 to approach the upper surface of the pulley 40 and in doing so to further compress the springs 53. A cylinder 58 is secured to the under surface of plate 45 at a point in which its center is positioned on a diameter extending at right angles to the diameter joining the screws 48. A piston 59 is positioned in this cylinder and has a piston rod 60 that projects through an opening in plate 45 and engages the under surface of steel plate 47. When air or other fluid is introduced into cylinder 58 through the pipe 61, it will force the piston 59 upwardly and flex the steel plate in the manner shown at the left in Figure 4. Secured to the under surface of plate 45 is a cylinder which has been designated by reference numeral 62. A piston 63 is mounted for reciprocation in this cylinder and is connected by means of a piston rod 64 with the under surface of the steel plate 47. It will be observed that two pipes, namely 65 and 66, communicate with the interior of cylinder 62, one on each side of the piston. If air or other fluid under sufficient pressure is introduced into the cylinder through pipe 65, it will cause the piston to move downwardly and to flex the steel plate 47 downwardly into the full line position shown at the right in Figure 4. If fluid under pressure is introduced through pipe 66, it will move the piston upwardly and flex the steel plate into the dotted line position.

It will be observed that the lower ends of racks 37 are provided with two spaced rollers 67 that embrace the edge of the flexible steel plate, and the latter therefore acts as a cam for determining the vertical position of the rollers and the racks to which they are attached. Since the vertical positions of the racks determine the pitch of the blades, it is evident that the vertical position of the edge of the steel plate 47 will determine the pitch angle of the propeller.

Referring again to Figure 1, let us assume that shaft 69 is turning thereby causing the propeller hub to rotate with shaft 28, it will be seen that the racks 37 will move about the edge of the steel plate 47 and if the latter is in a flat position, there will be no change in the angular position of the blades during such rotation. If air is introduced into cylinder 54 under sufficient pressure to move the piston 55 downwardly against the bottom, the plates 45 and 47 will be moved downwardly a corresponding distance and this movement will cause the racks 37 to move downwardly thereby turning the blades 38 in a clockwise direction when viewed as in Figure 5, through such an angle that the blades will have a minus pitch, that is, the front end 39 will be lower than the rear end. If piston 55 is stopped in an intermediate position, the pitch of the blades will be zero, that is the planes of the blades will be parallel to the plane of rotation and there will be no lifting force exerted. This position is used in warming the engine preparatory to flight and for volplaning under certain conditions. When the pressure is released springs 53 move plates 45 and 47 into the position shown in Figure 1, the positive lifting pitch position, which, for the purpose of this description, will be considered as 22½ degrees. If the propellers are operated at full speed under these conditions, all the blades will exert a lifting force and when properly proportioned these lifting forces will be sufficient to raise the airplane from the ground and to hold it suspended in the air or to move it upwardly at any desired velocity. After the airplane has been lifted from the ground, the operator introduces air under pressure into cylinder 58, thereby flexing the steel plate 47 into the position shown at the left side of Figure 4. The remainder of the plate is left in the position shown in Figure 1, and therefore when the propellers rotate, the pitch will be increased and then decreased as the rollers 57 are first moved upwardly and then downwardly in accordance with the inclination of the bent portion of plate 47. This pitch variation is preferably of sufficient extent to increase the pitch of the blades from 22½ degrees to approximately 90 degrees, and since the blades move rearwardly when adjacent the sides of the fuselage, they will exert a propulsive force during their rearward movement, due to their high pitch. We now have a condition in which the blades, for the greater part of the circumference, are in a lifting pitch and serve to support the airplane and during the remainder of their rotation serve to propel the plane. The plane will therefore be supported and propelled by means of the mechanism described. If, for any reason it should become necessary to effect a sudden drop in elevation, the pilot, by opening a valve and introducing air under pressure through pipe 65 into cylinder 62, flexes the steel plate downwardly as shown by full lines in Figure 4, whereupon the blades, for a portion of each revolution, will have a negative pitch.

If a sudden descent is necessary, the operator releases the air from cylinder 58 and introduces air into cylinder 54 whereupon the parts are moved downwardly so as to put the propeller blades into a negative pitch and since the plate 47 is now entirely flat, this negative pitch is maintained for the complete revolution of the propellers, thereby urging the airplane downwardly at a faster rate than of gravity alone.

If, for any reason it should be necessary to use the propellers to secure a braking action, the whole assembly, comprising the pulley 40, the hub 41 and the two plates 45 and 47, is rotated 180 degrees without otherwise changing the adjustments, whereupon the propulsive force will be exerted by the blades as they move forwardly, thereby producing a braking action instead of a forward propulsive action.

In the drawings and in the description mechanisms comprising cylinders, pistons and compressed air have been shown and described for performing various changes. This is merely illustrative as it is possible in most of these cases to substitute an electromagnetic device for example an iron-clad electromagnet in which the armature performs the function of the piston.

Having described the invention what is claimed as new is:

1. In an airplane having a propeller mounted for rotation about a vertical axis, the blades being mounted for pitch adjustment, a pitch control mechanism associated with the propeller, comprising a plate of flexible elastic metal, a rack associated with each propeller blade, forming part of a blade rotating device, the rack having spaced portions engaging opposite sides of the plate adjacent the edge thereof, means for bending the plate about a diameter, whereby a portion of its edge will be positioned at various distances from its normal plane, and means for rotating the propeller, whereby the racks will be reciprocated and the blade pitch changed in accordance with rack reciprocation.

2. In an airplane having a propeller mounted for rotation about an upwardly ranging axis, the blades being mounted for pitch adjustment, a pitch control mechanism associated with the propeller, comprising, a plate of flexible elastic material, a rack associated with each propeller blade forming part of a blade rotating device, the rack having a member contacting the surface of the plate, means for bending the plate about a diameter, whereby a portion of the edge will be positioned at various distances from its normal plane, and means for rotating the propeller whereby the rack will be reciprocated and the blade pitch changed in accordance with the rack reciprocation.

DAVID W. MAIN.